United States Patent [19]

Allen et al.

[11] 4,094,844

[45] June 13, 1978

[54] WATER-BORNE EPOXY RESIN COATING COMPOSITIONS

[75] Inventors: Roy A. Allen; Leroy W. Scott, both of Houston, Tex.

[73] Assignee: Shell Oil Company, Houston, Tex.

[21] Appl. No.: 782,208

[22] Filed: Mar. 28, 1977

[51] Int. Cl.$^2$ .................. C08L 61/06; C08L 63/00
[52] U.S. Cl. .................. 260/29.3; 260/29.4 R; 260/831; 260/834
[58] Field of Search .................. 260/831, 834, 29.3, 260/29.4 R

[56] References Cited

U.S. PATENT DOCUMENTS 3,215,586  11/1965  Lister .................. 260/42.28

FOREIGN PATENT DOCUMENTS

| 1,934,715 | 1/1971 | Germany. |
| 2,153,616 | 5/1973 | Germany. |
| 1,017,699 | 1/1966 | United Kingdom. |
| 1,141,206 | 1/1969 | United Kingdom. |

*Primary Examiner*—Paul Lieberman
*Attorney, Agent, or Firm*—Norris E. Faringer

[57] ABSTRACT

Hydrolytically-stable, water-soluble, curable coating compositions are prepared by (1) condensing an excess of a lower molecular weight epoxy resin with an amino-substituted benzoic acid, (2) reacting the terminal epoxide groups of the resulting condensate with a secondary amine and then (3) solubilizing the product by neutralizing or reacting the carboxyl groups with a tertiary amine or ammonia.

9 Claims, No Drawings

WATER-BORNE EPOXY RESIN COATING COMPOSITIONS

BACKGROUND OF THE INVENTION

Current EPA-compliant water-borne coatings such as those in which the volatile component contains less than 20% organic solvent are very much in demand, especially for metal decorating and can lining applications.

Although excellent performance has been obtained for many years from systems based on organic solvent-borne, solid, epoxy resin type compositions cured with aminoplast or phenolic resins, these coating systems contain about 60–70% organic solvent, and therefore cannot comply with existing air pollution regulations without recourse to costly incineration of the solvent driven off during the baking step.

Currently, two approaches have been taken to develop a water-borne epoxy resin baking system for use in baked coatings such as can linings: (1) the so-called "high acid number" epoxy resin ester vehicle and (2) emulsions of solid epoxy resins. Both types of compositions are blended with a suitable curing agent, such as the amino resins, to achieve crosslinking during a typical bake schedule of 10 minutes at 400° F. The epoxy ester approach produces good roller coating application properties, i.e. good rheology; however, this ester coating falls short in resistance to food products, and the storage stability of these epoxy ester types is only fair. On the other hand, the solid epoxy resin emulsion systems give good cured film properties, but have poor application properties on high speed roller coaters.

It would be very desirable to combine the best properties of each system into a single system.

SUMMARY OF THE INVENTION

The present invention provides an epoxy resin system which combines the good application properties of the water soluble epoxy ester type with the excellent film properties of the emulsion type into a single system.

It is believed that the poor hydrolytic stability of the solubilized epoxy resin ester vehicles results from the fact that such resins are solubilized in water by means of pendant carboxyl groups attached to the resin molecule through ester linkages. These ester linkages are quite vulnerable to hydrolytic attack, particularly due to the basicity of the system caused by the solubilizing amine. Thus, on storage, the carboxyl groups are split from the resin via ester cleavage, resulting in a gradual decrease in miscibility leading ultimately to phase separation.

The instant invention, therefore, provides a multiple-step process for preparing hydrolytically-stable, water-soluble, curable coating compositions.

In a first step, an excess of a low molecular weight (liquid) epoxy compound is reacted with an amino-substituted benzoic acid.

In the second step, the condensate, which contains carboxyl groups attached to the resin backbone through hydrolytically stable carbon-nitrogen linkages and terminal epoxy groups, is reacted with a secondary amine such as N-methylethanolamine or diethanolamine.

In the third step, the adduct is further reacted with a tertiary amine such as triethylamine or 2-dimethylamino-2-methyl-1-propanol, or ammonia to solubilize the adduct by the "neutralization" of the carboxyl groups.

The resulting water-solubilized adduct can be cured with conventional curing agents, particularly the water soluble amino-containing resins, to produce excellent surface coatings.

DESCRIPTION OF THE PREFERRED EMBODIMENT

The preparation of the instant hydrolytically-stable, water-soluble epoxy coating composition, which when cured with suitable curing agents, such as amino resins and the like, produce excellent surface coatings, comprises a three-step method.

In the first step, an amino-substituted benzoic acid, such as para-aminobenzoic or anthranilic acid (ortho-aminobenzoic acid) is reacted with an excess of a low molecular weight (liquid) epoxy resin at temperatures low enough to react to amine groups with the epoxy resin, while leaving the carboxyl group essentially unreacted. This reaction is carried out in a suitable solvent, such as the monoethyl ether of ethylene glycol, 80% non-volatile.

In the second step, the terminal epoxy groups are reacted with a secondary amine, such as N-methylethanolamine or diethanol amine. The carboxyl groups are essentially unreacted, i.e., greater than about 90% of the -COOH groups remain intact after the second step reaction.

In the third step, the carboxyl groups of the reaction product from the second step are "neutralized" with ammonia or a tertiary amine such as triethylamine or 2-dimethyl-2-methyl-1-propanol. Water is then gradually added to this neutralized resin to produce a solution. A suitable crosslinking agent such as a hexamethoxy methyl melamine resin can then be added to yield an aqueous baking system especially suitable for metal decorating and can lining applications. An alternate procedure, preferred when less water soluble crosslinkers are used, is to mix the crosslinking resin into the above reaction product after neutralization, and then gradually adding the water.

As noted hereinbefore, the present condensates are prepared in a three-step process wherein in the first step, a lower molecular weight epoxy resin is condensed with an aminobenzoic acid; in the second step, the condensate is reacted with sufficient secondary amine to react with the terminal epoxy groups without significantly reacting with the carboxyl groups; and in the third step the adduct or condensate is reacted with a tertiary amine to solubilize the adduct via neutralization of the carboxyl groups.

Suitable epoxy resins comprises the low molecular weight, normally liquid epoxy resins prepared by reacting a phenol with epichlorohydrin in the presence of an alkaline medium. The preparation of such epoxy resins is well known in the art.

Preferred epoxy resins are the epoxy polyethers of polyhydric phenols and more preferred, the glycidyl polyethers of polynuclear phenols such as 2,2-bis(4-hydroxyphenyl)propane (BPA).

Under some circumstances it may be desirable to use a phenol which has been substituted with a halogen, such as tetra-bromo BPA. Also included in the present invention are the so-called "hydrogenated" epoxy resins which are obtained by several methods. One method comprises hydrogenating the glycidyl ether of a polyhydric phenol so as to saturate the aromatic ring. Another method comprises reacting a hydrogenated or saturated phenol such as 2,2-bis(4-hydroxycyclohexanol)propane with epichlorohydrin in the presence of an alkaline medium. Both methods are well-known in the art.

The most preferred epoxy resin is a glycidyl polyether of 2,2-bis(4-hydroxyphenyl)propane having a molecular weight between about 350 and 1000. A very suitable glycidyl polyether is designated as polyether A in U.S. Pat. No. 2,633,458.

Suitable amino-substituted benzoic acids include the orthometa- and para- aminobenzoic acid. The para-aminobenzoic acid is preferred. Other suitable aminobenzoic acids may include those with substituents such as halogens.

The para-aminobenzoic acid is condensed with the glycidyl polyether under conditions which cause the amine group to react with the polyether, while leaving the carboxyl group essentially unreacted. In general, a low temperature is employed such as about between 150° and 250° F. In general, the reactants are combined to give an excess of epoxy compound, up to about 25% excess, may be employed. Expressed another way, the amounts of epoxy resin and aminobenzoic acid employed will usually be in amounts to produce a condensate having a theoretical acid number between about 30 to 90, preferably between about 40 and 60, and a weight per epoxy (WPE) of from about 600 to about 1900, preferably from 800 to about 1300.

In the second step, the terminal epoxide groups of the condensate are reacted with a secondary amine without significant reaction with the carboxyl groups.

Suitable secondary amines include the amines of the general formula:

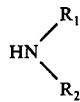

wherein $R_1$ and $R_2$ may be the same or different hydrocarbon radicals; such as alkyl radicals: methyl, propyl, butyl, and the like; alkanol radicals: methanol, ethanol, propanol and the like.

Examples of very suitable secondary amines include N-methylethanolamine, diethanolamine, dimethylamine, diethylamine, dipropylamine, diphenylamine, dibenzylamine, and morpholine.

In general, stoichiometric amounts of the epoxy condensate and secondary amines are employed, although a slight excess of either reactant may be employed under some conditions. It is generally desirable to provide one amino hydrogen to one epoxy group. Thus, a suitable ratio would be one mole of epoxy condensate to two moles of amine.

The second step reaction is generally performed at temperatures between about 150° and 250° F, and preferably between about 210° F and 240° F.

It has been found that under these conditions, greater than about 90% of the carboxyl groups remain in the backbone of the condensate after reaction with the secondary amine.

In the third step, the carboxyl-containing adduct or condensate is solubilized by reacting the adduct with a tertiary amine or ammonia. Simply, the product is mixed in a suitable organic solvent to give 75–85% non-volatiles, and sufficient tertiary amine is added to stiochiometrically react with the carboxyl groups. Sufficient water is then added to the "neutralized" or solubilized resin to produce a clear to slightly hazy solution.

Suitable tertiary amines include the amines of the general formula:

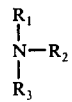

wherein $R_1$, $R_2$ and $R_3$ may be the same or different hydrocarbon radicals; such as alkyl radicals: methyl, propyl, isopropyl, butyl, etc.; alkanol radicals: methanol, ethanol, propanol, isopropanol, and the like.

Examples of very suitable tertiary amines include triethylamine, triisopropylamine, tributylamine, dimethylethanolamine and diethylethanolamine. A preferred tertiary amine is 2-dimethylamino-2-methyl-1-propanol.

Preferred are the tertiary amines and ammonia.

Suitable organic solvents include the ether alcohols, such as the methyl, ethyl or butyl ethers of ethylene glycol or propylene glycol as well as methyl OXITOL ® glycol ether and methyl CELLOSOLVE ® esters such as CELLOSOLVE ® acetate (ethylene glycol monoacetate) and methyl CELLOSOLVE ® acetate (acetate of ethylene glycol monoethyl ether); and alcohols such as methanol, ethanol, isopropanol, etc., as well as water-miscible ketones such as methyl ethyl ketone (MEK), methyl isobutyl ketone (MIBK), and cyclohexanone.

In general, the neutralization step is performed at a temperature from about 150° F to about 200° F.

As stated, sufficient water is added to produce a suitable solution of the adduct. Excellent baking enamels are then prepared by adding a water-soluble or water-miscible cross-linking agent to the resulting adduct solution.

In general, the total amount of water added will generally vary so that the final coating solution contains from 20% to 30% nonvolatiles (NV), with from about 70 to 90% by volume of the total solvent being water.

Suitable water-soluble cross-linking agents include the so-called amino resins or amino-plasts containing —NH$_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in cross-linking epoxy resins mostly through methylol groups is also well-known. Accordingly, a large number of aminoplast and phenol-plast resins, i.e., urea-formaldehyde and melamine-formaldehyde resis, are commercially available under such trade designations as Plaskon, Beetle, Cymel, Fiberite, Resimene, Curacron and Beckamine, among many others.

A very suitable water-soluble cross-linking agent include the hexamethoxy methylmelamines marketed under trade designation of CYMEL ®.

The aqueous system may be applied to the substrate by any suitable means such as by brush, blade or spraying. The resulting coating is then cured by heating for 2 to 10 minutes at 350° F to 400° F.

Of course, other conventional additives may be employed such as catalysts, thixotropic agents, plasticizers, pigments, fillers, etc.

In order to illustrate the invention more fully, a number of specific embodiments are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

EXAMPLE I

This example illustrates the preparation of the instant water-soluble adducts and the preparation of baked coatings therefrom.

Into a four-necked flask equipped with a stirrer, nitrogen blanket, thermometer, condenser and heating mantle was charged 760 parts by weight of EPON ® Resin 828 (a glycidyl polyether of 2,2-bis-(4-hydroxyphenyl) propane having an average molecular weight of about 380 and a weight per epoxy (WPE) of 180) and 240 parts by weight of para-aminobenzoic acid. OXITOL ® Glycol Ether was then added (330 parts by weight) to yield a processing mixture at 75% non-volatile.

The mixture was reacted at 65° C for 15 hours. The resulting product was essentially a linear amine precondensate resin with terminal epoxy groups and pendant carboxyl groups. Under these reaction conditions less than 10% of the carboxyl groups are consumed.

100 parts by weight (non-volatile basis) of the resulting epoxy-terminated precondensate which had an acid value of 98 and a WPE of 2000 was reacted with 3.7 parts by weight of N-methyl ethanolamine (approximately stoichiometrical amounts) at a temperature of 65° C for 4 hours.

To 100 parts by weight (non-volatile basis) of this carboxyl-containing precondensate was added 17.7 parts by weight of triethylamine to neutralize.

This neutralized resin was then modified by adding various amounts of a cross-linking agent (CYMEL ® Resin 301) and reduced with water to 30% non-volatiles.

Films were prepared and baked at 5 and 10 minutes at 365° and 400° F, and tested for MEK resistance, "COVERALL" flex and resistance to steam processing.

MEK resistance is the measure of the resistance of the baked surface coating to rubbing by increasing the number of double rubs of a gauze pad saturated with methyl ethyl ketone (MEK) required to soften the surface.

The "COVERALL" flexibility test is also known as the wedge bend test. This test is run by coating a 1 inch × 4 inch panel of electrolytic tin plate and bending it over a ⅛ inch mandrel, the mandrel being in the long direction. The folded panel thus produced is then impacted (40 inch-pounds) in a device called a "COVERALL" tester to form a wedge-shaped bend, zero diameter (i.e. flat) at one end, ⅛ inch at the other. This test piece is then immersed in acidified (3% HCl) saturated $CuSO_4$ solution for 2 minutes to stain any breaks in the film. The distance from the flat end in millimeters that breaks in the film can be detected is recorded as the "COVERALL" test reading.

The steam processing resistance was measured by subjecting cured films of coating, 0.0002 inch thickness to 90 minutes in steam at 15 pounds pressue (250° F) in a pressure cooker. The panels were removed and tested immediately for cross hatch tape adhesion, and examined for blushing (whitening).

TABLE I

| FILM PROPERTIES OF EPON ® RESIN 828/p-AMINOBENZOIC ACID PRECONDENSATE COATINGS | | | | | |
|---|---|---|---|---|---|
| CYMEL RESIN 301 LEVEL, % | BAKE SCHEDULE MIN. / ° F | MEK DOUBLE RUB | COVERALL FLEX mm | STEAM PROCESSING | |
| | | | | BLUSH | ADHESION |
| 15 | 10 / 400 | | 46 | 10 | 10 |
| | 15 / 400 | | 46 | 9 | 10 |
| | 10 / 365 | | 54 | 9 | 10 |
| | 5 / 365 | | 57 | 6 | 10 |
| 20 | 10 / 400 | | 52 | 10 | 10 |
| | 5 / 400 | All Greater | 49 | 10 | 10 |
| | 10 / 365 | than 100 | 46 | 8 | 10 |
| | 5 / 365 | | 51 | 6 | 10 |
| 25 | 10 / 400 | | 54 | 10 | 10 |
| | 5 / 400 | | 55 | 9 | 10 |
| | 10 / 365 | | 45 | 9 | 10 |
| | 5 / 365 | | 50 | 6 | 9 |
| Solvent Borne Control System[1]) | 10 / 400 | | 30 | 10 | 10 |

1)EPON Resin 1007/Beckamine Resin P-196, 80/20

The results of these experiments are tabulated in Table I.

A review of the data shows that the MEK resistance is good, being better than 100 double rubs even at the lowest bake schedule. In steam processing, adhesion is more than adequate for all three systems at all bake schedules. In blush resistance, panels baked for 5 and 10 minutes at 400° F and 10 minutes at 365° F were good to excellent, while panels baked at a lower temperature and shorter bake schedule (5 minutes at 365° F) exhibited blushing.

What is claimed is:

1. A hydrolytically-stable, heat-curable composition comprising:

(1) a water-soluble composition prepared by (a) condensing a chemical excess of a lower molecular weight epoxy resin with an amino-substituted benzoic acid, (b) reacting the terminal epoxide groups of the resulting condensate with a secondary amine and then (c) solubilizing the product of (b) by neutralizing the carboxyl groups with a tertiary amine or ammonia, and (2) a curing amount of a water-miscible aminoplast or phenolplast resin.

2. The composition of claim 1 wherein the amino-substituted benzoic acid is para-aminobenzoic acid.

3. The composition of claim 1 wherein the epoxy resin is a glycidyl polyether of 2,2-bis(4-hydroxyphenyl)propane having a molecular weight between about 350 and 1000.

4. The composition of claim 1 wherein the condensate of step (a) has an acid number between about 30 and 90 and a weight per epoxy of from about 600 to about 1900.

5. The composition of claim 1 wherein the secondary amine is N-methyl ethanolamine.

6. The composition of claim 1 wherein the tertiary amine is triethylamine..

7. The composition of claim 1 wherein the curing agent is a hexamethoxy methylmelamine resin.

8. The composition of claim 1 containing from about 20% to 30% by volume non-volatiles in a solvent.

9. The composition of claim 8 wherein the solvent contains from about 70% to 90% by volume of water and from about 10% to 30 % by volume organic solvents.

* * * * *